(12) United States Patent
Chen

(10) Patent No.: US 6,694,842 B1
(45) Date of Patent: Feb. 24, 2004

(54) STRUCTURE RESTRAINING MOVEMENT OF A HANDLE OF A CHILDREN'S CYCLE

(75) Inventor: Ting-Hsing Chen, Tainan Hsien (TW)

(73) Assignee: Far Great Plastics Industrial Co., Ltd., Tainan Hsien (TW)

( * ) Notice: Subject to any disclaimer, the term of this patent is extended or adjusted under 35 U.S.C. 154(b) by 14 days.

(21) Appl. No.: 10/235,741

(22) Filed: Sep. 6, 2002

(51) Int. Cl.[7] .................. B62K 21/16; B62K 21/12
(52) U.S. Cl. ............... 74/551.3; 24/551.1; 280/279
(58) Field of Search .................. 74/551.1–551.8; 280/279, 264, 7.1, 87.042

(56) References Cited

U.S. PATENT DOCUMENTS

| | | | | |
|---|---|---|---|---|
| 4,274,647 A | * | 6/1981 | Drake, Jr. | 280/87.042 |
| 4,565,384 A | * | 1/1986 | Dehnisch | 280/279 |
| 4,624,470 A | * | 11/1986 | Love | 280/279 |
| 4,691,930 A | * | 9/1987 | Samuel | 280/7.1 |
| 5,791,671 A | * | 8/1998 | Tang et al. | 280/264 |
| 5,967,538 A | * | 10/1999 | Callaluca et al. | 280/279 |
| 6,299,190 B1 | * | 10/2001 | Su | 280/279 |
| 2002/0074770 A1 | * | 6/2002 | Lane | 280/279 |

FOREIGN PATENT DOCUMENTS

JP          2-99482     *  4/1990  .............. 280/279

* cited by examiner

*Primary Examiner*—Vinh T. Luong
(74) *Attorney, Agent, or Firm*—Rosenberg, Klein & Lee

(57) ABSTRACT

A structure restraining movement of a handle of a children's cycle comprises a handle, a frame, a cover and a block. The handle has a bolt and a nut. The frame comprises a strut at the front end. Both the cover and block comprise a hole at their center portion thereof, whereas the cover is secured to the handle and the block is secured to the strut of the frame. By inserting the bolt through the holes of the cover and the block, the handle and the frame are pivoted and secured together with the nut from the other end. This secures the handle to the frame of the cycle and allows the handle to turn with respect to the frame. Whereas a stud protruding from the cover seats in an arc slot of the block, which restrains the stud to go any further when it has reached to the two ends of the arc slot, this also restrains the handle to turn to a certain position.

1 Claim, 4 Drawing Sheets

STRUCTURE RESTRAINING MOVEMENT OF A HANDLE OF A CHILDREN'S CYCLE

FIELD OF THE INVENTION

This invention relates to a handle of a children's cycle, and more particularly, to a handle which restrains the turning movement of the handle.

BACKGROUND OF THE INVENTION

There are plenty of bicycles or tricycles for children to play with. All these models do not confine the turning movement of the handle, which makes the cycle more maneuverability, however, if the child makes a wide turn, the child will lose the balance and cause an accident.

In view of this, the inventor has invented the present invention to improve the above-mentioned shortcoming.

SUMMARY OF THE INVENTION

It is the primary object of the present invention to provide a structure restraining turning of a handle of a children's cycle, which is safe for children to ride the cycle.

It is another object of the present invention to provide a structure restraining turning of a handle of a children's cycle, which is easy to operate.

It is a further object of the present invention to provide a structure restraining turning of a handle of a children's cycle, which is easy to install.

DETAILED DESCRIPTION OF THE PREFERRED EMBODIMENT

Figure 1:
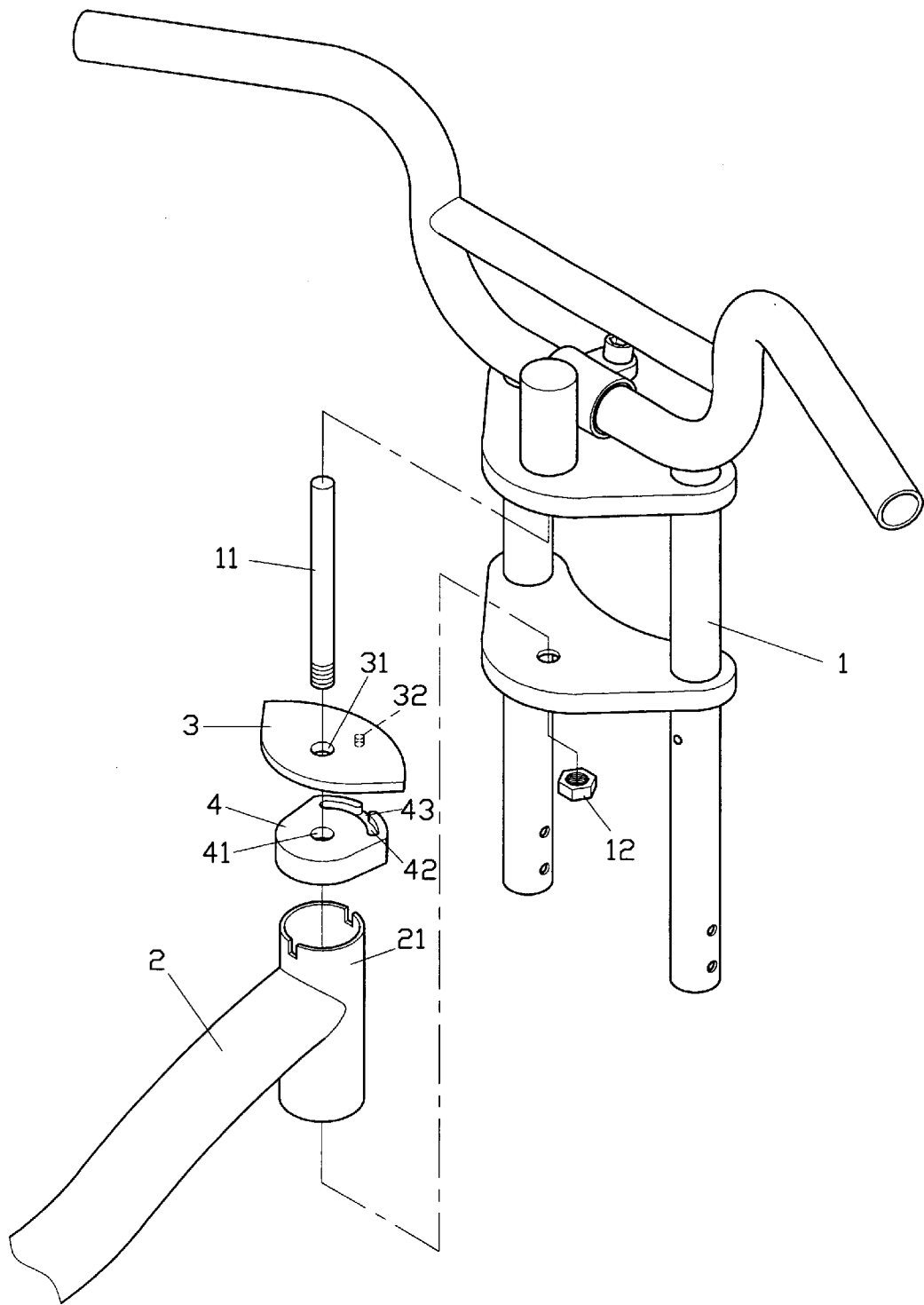
FIG. 1 is an exploded view of the present invention.

A structure restraining turning movement of the handle of a children's cycle comprises a handle 1, a frame 2, a cover 3 and a block 4.

The handle 1 comprises a bolt 11 and a nut 12. The frame 2 comprises a strut 21 at the front end. The cover 3 has a hole 31 at the center thereof and a stud 32 protruding from the cover 3. The block 4 comprises a hole 41 at the center portion, and an arc slot 42 with a notch 43 at the front of the slot 42 corresponding to the stud 32 of the cover 3.

Figure 2:
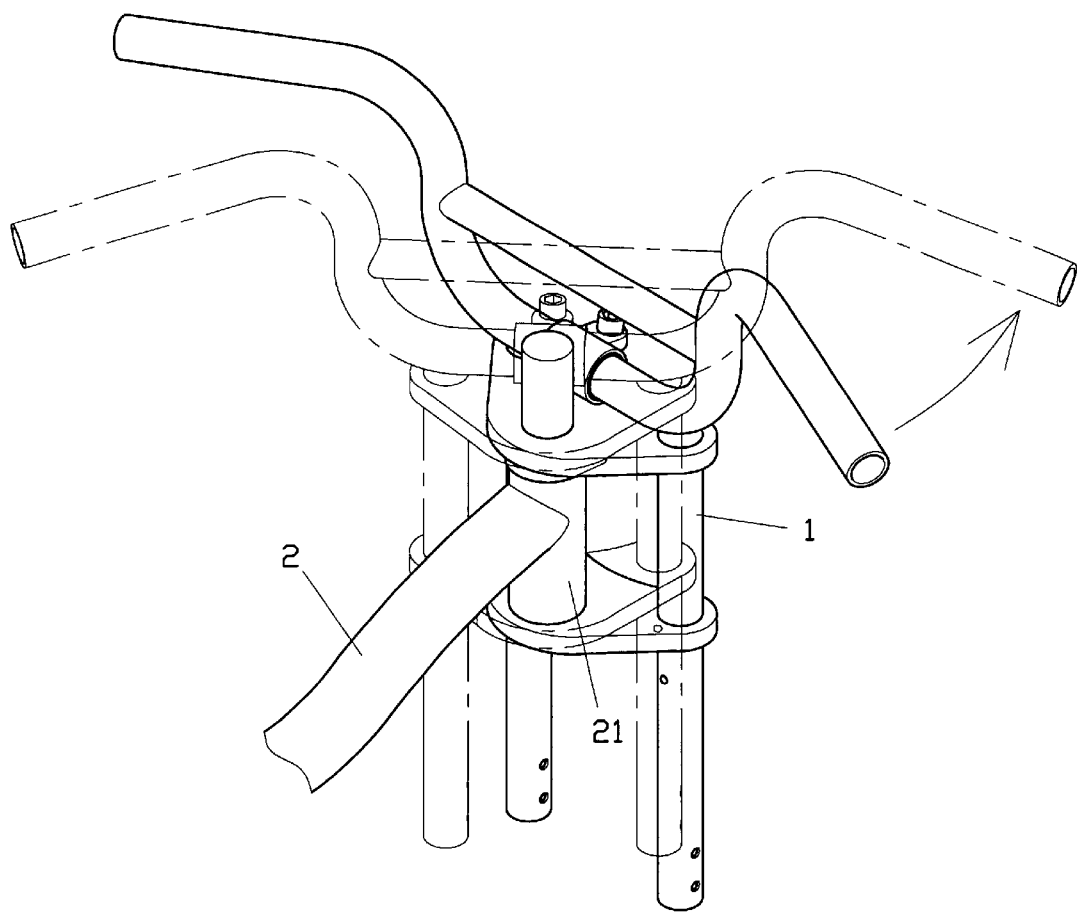
FIG. 2 is a perspective view of the present invention, depicting turning movement of the handle.
Figure 3:
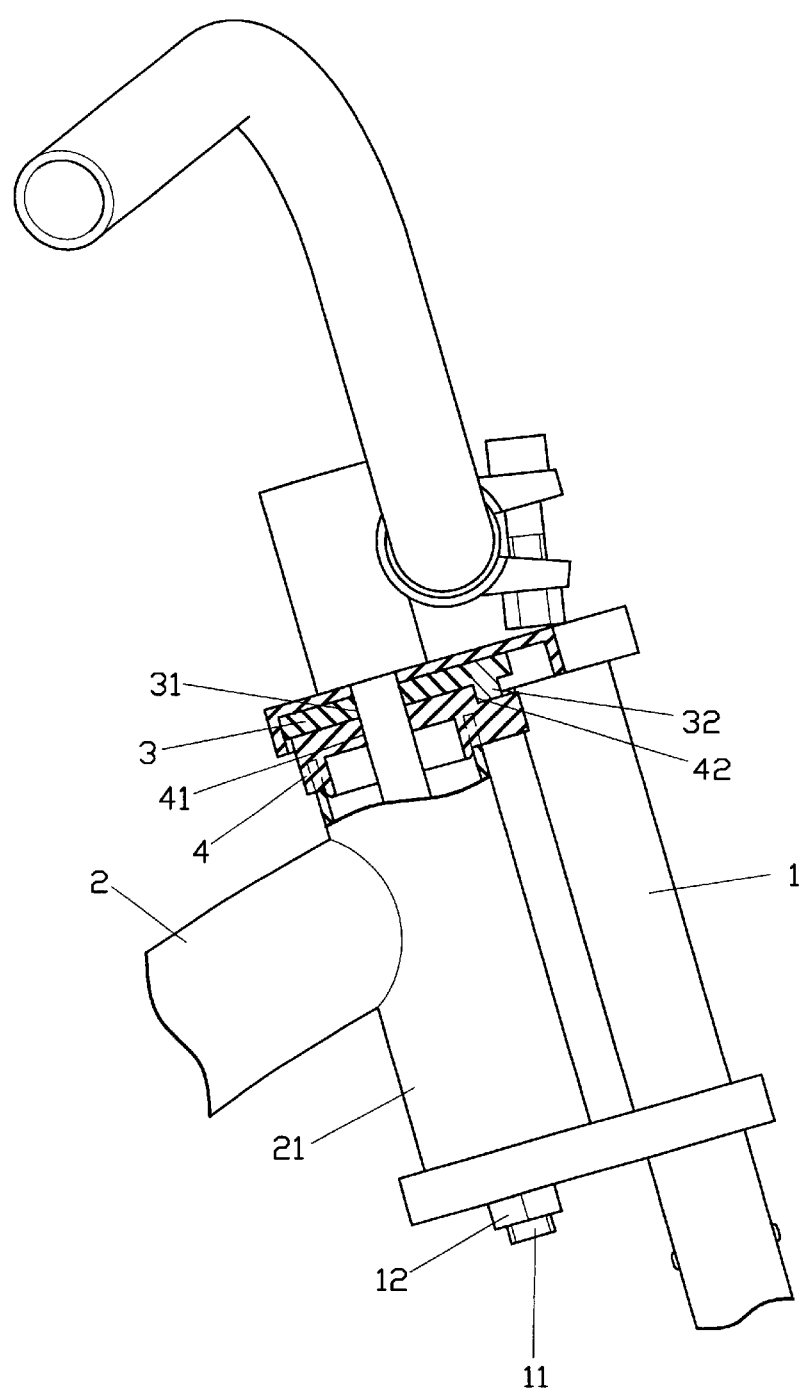
FIG. 3 is a side view of FIG. 2, partially sectioned.
Figure 4:
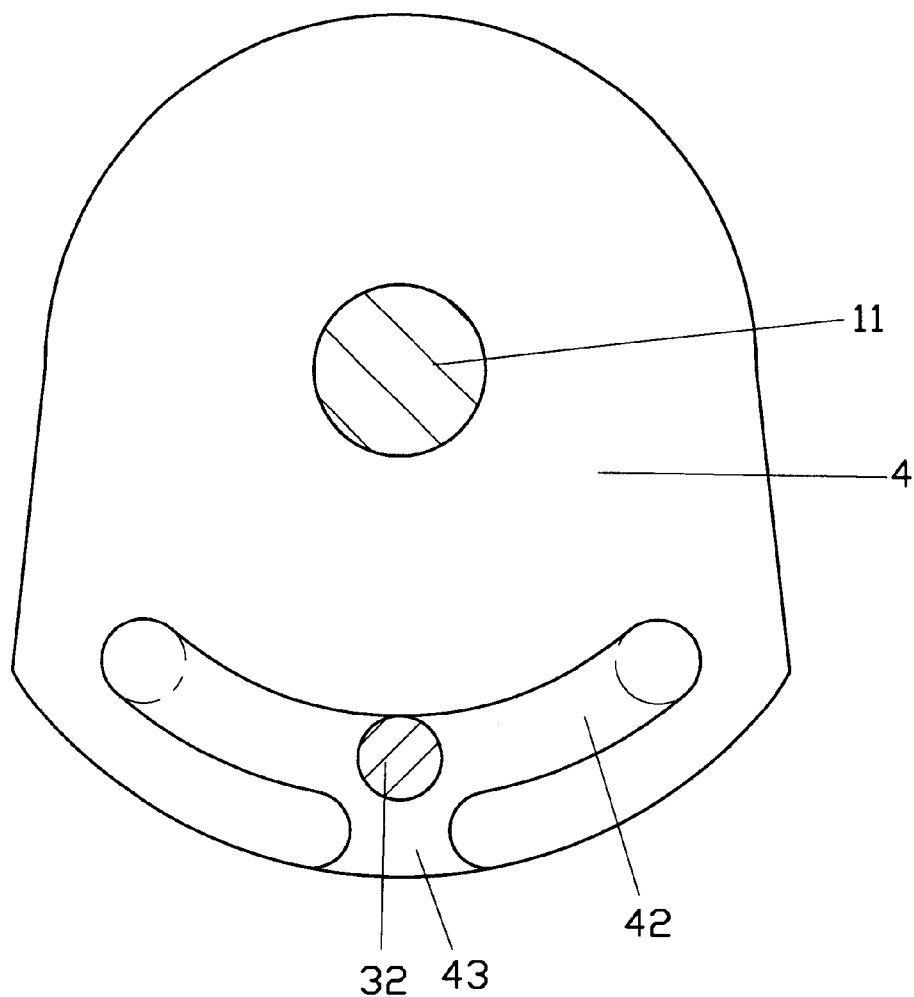
FIG. 4 is a top sectional view depicting a stud sliding within a slot of a block of the present invention.

To assemble, as shown in FIGS. 2 and 3, the cover 3 is secured to the handle 1 and the block 4 is secured to the strut 21 of the frame 2. The bolt 11 is inserted through the holes 31 and 41 of the cover 3 and the block 4 and secured with the nut 12 at the other end. The handle 1 is pivoted to the frame 2, and the stud 32 is located in the arc slot 42 of the block 4, as shown in FIG. 4. By turning the handle 1, the stud 32 will move along with the handle 1. However, upon reaching the two ends of the arc slot 42, the turning movement will be stopped to confine the handle 1 from further turning.

I claim:

1. A structure restraining turning movement of a handle of a children's cycle comprising a handle, a frame, a cover and a block, wherein said handle comprising a bolt and a nut, said frame comprising a strut at front end, said cover comprising a hole at center portion and a stud protruding therefrom, and said block comprising a hole at center portion and an arc slot with a notch at front end, said cover being secured to said handle, said block being secured to said strut of said frame, said bolt being inserted through said holes of said cover and said block and secured with said nut, said handle and said frame being pivoted together so that said handle may turn with respect to said frame, and being characterized in that:

said cover having said stud and said block having said arc slot corresponding to said stud, said stud sliding in said arc slot of said block to confine turning movement of said handle.

* * * * *